United States Patent [19]

Wielonski et al.

[11] 4,422,915

[45] Dec. 27, 1983

[54] PREPARATION OF COLORED POLYMERIC FILM-LIKE COATING

[75] Inventors: Roy F. Wielonski, Worthington; Harry A. Beale, Columbus, both of Ohio

[73] Assignee: Battelle Memorial Institute, Columbus, Ohio

[21] Appl. No.: 72,509

[22] Filed: Sep. 4, 1979

[51] Int. Cl.[3] .......................... B05D 3/06; C08F 00/00

[52] U.S. Cl. ................................................... 204/165

[58] Field of Search ........... 204/165, 168, 169, 192 C; 427/41; 427/39

[56] References Cited

U.S. PATENT DOCUMENTS

| | | | |
|---|---|---|---|
| Re. 30,635 | 6/1981 | Kuppers et al. | 427/38 |
| 3,690,932 | 9/1972 | Geffcken et al. | 427/38 |
| 3,822,928 | 7/1974 | Smolinsky et al. | 350/96 WG |
| 4,013,532 | 3/1977 | Cormia et al. | 204/192 C |
| 4,048,349 | 9/1977 | White et al. | 427/58 |
| 4,226,896 | 10/1980 | Coburn et al. | 427/34 |

FOREIGN PATENT DOCUMENTS 1488513 7/1967 France .

OTHER PUBLICATIONS

Hollahan et al., Tech. & Applications of Plasma Chem., pp. 191–213, pub. by John Wiley & Sons, New York, (1974).

Schulman et al., Int'l. Series Mono. on Physics, pp. 256–273, pub. by MacMillan, (1962).

Wang et al., Philosophical Mag. B., vol. 39, No. 3, pp. 277–282, (1979).

Powell et al., Vapor Deposition, pp. XI–XIV, pub. by John Wiley & Sons, New York, (1966).

Tasaki et al., Jap. J. of Appl. Physics, vol. 4, No. 19, pp. 707–711, (1965).

Xerox Disclosure Journal, vol. 2, No. 2, Mar./Apr. 1977, Stamford (Conn.), S. R. Perez et al., "Formation of Organic Photoreceptors by In Situ Polymerization".

*Primary Examiner*—F. Edmundson

*Attorney, Agent, or Firm*—Kenneth R. Warburton

[57] ABSTRACT

The invention provides a method of coating a surface 21 of a substrate 20, or of an article, of a material, such as glass, metal, ceramic, cloth or the like, with a colored film-like polymeric coating 22 consisting essentially of a plasma formed polymer matrix 23 containing therein particulates 24. The method comprises introducing plasma-polymerizable material through at least one conduit 30 into the interior region 14 of an appropriate apparatus 10, 35, or 39 in which region 14 there is maintained an electrical discharge conductive to plasma polymerize the introduced material and deposit it on surface 21 concurrently with a depositing therewith of the particulates 24, or color centers, of a size and in a distribution adapted through selective scattering and adsorption of light to provide a desired color while the substrate 20 contacts, or is, a cathode element 19 maintained at an electrical potential conducive for the depositing. Preferably the particulates are opaque and colloidal and provided by thermal evaporation employing a filament resistance heater 29, inductively heated evaporation source means 36, or an electron beam evaporator means 40.

10 Claims, 4 Drawing Figures

PREPARATION OF COLORED POLYMERIC FILM-LIKE COATING

TECHNICAL FIELD

This invention concerns a method of preparation of colored polymeric film-like coatings. More particularly the invention relates to plasma polymerization of a monomer and/or other plasma-polymerizable material to provide the polymeric film-like coating while, concurrently with the polymerizing and a depositing of resulting polymer, also depositing dispersed therein particulate material of a size and distribution adapted to alter the color of the polymer to the visible eye and through selective scattering and adsorption of light by the deposited dispersed particulates to provide a desired color.

The invention uses plasma polymerization techniques and knowledge and combines therewith a coloring of plasma-formed polymer concurrently with its depositing on the surface of the substrate being coated. The coloring involves, throughout the depositing polymer, a depositing of particulates of a size and distribution adapted to alter the color of the polymer by selective scattering and absorption of light to provide a desired visible color. Providing of these particulates and their concurrent deposition with polymer provided by the plasma polymerization is by any of several procedures including gas entrainment, vacuum deposition techniques, such as low-pressure thermal evaporation, electron beam evaporation, sputtering and the like.

The invention provides colored polymeric film-like coatings on surfaces of any of numerous substrate materials, such as glass, various metals, cloth, ceramics and the like, as well as articles composed of the materials, and after deposit provides decorative, protective, and like useful functions for these surfaces.

BACKGROUND ART

Plasma polymerization of numerous plasma-polymerizable materials, including various monomers containing a functional group permitting polymerization by more conventional means, into films are extensively taught in the printed literature, with the printed knowledge also including teachings of these films being deposited as plasma-formed polymer on numerous substrate materials. Illustrative teachings of plasma polymerization art can be found in "Techniques and Applications of Plasma Chemistry" by John R. Hollahan and Alex T. Bell, John Wiley & Sons, 1974, pages 191-213 under the section titled "Mechanisms of Plasma Polymerization". This section includes a Table 5.5, titled "Films Produced by Plasma Techniques", which tabulates numerous plasma-polymerizable materials, i.e. materials functioning as monomers under plasma, as well as films resulting therefrom. Included in the reported prepared films are several noted to be colored, such as brown or yellow, although in so far as is known none of the plasma formed colored films are prepared by the method of the present invention and none rely on particulates distributed therein to provide a desired color. Coloration of additively colored salts from containment thereby of various size particulates of metals deposited at dislocations of the salt are discussed in literature, such as illustrated by "International Series of Monographs on Physics" by Schulman and Compton, The MacMillan Company, 1962, pages 256-273, Chapter IX headed "Coloration by Colloidal Centers". In the teachings in this chapter, FIGS. 9.3 and 9.4 on page 259 illustrate extinction curves for light absorption and scattering of NaCl containing one part per million of metallic sodium particles for various sizes of sodium particles ranging in size from about 0 mμ to 80 mμ. Table 9.1 on page 260 presents information on the correlation of colors of various sodium chloride crystals from disposed therein particles of specified size ranges to illustrate that color by transmitted light can be altered through change of particle size. The optical scattering of gold particles in a polyester matrix is reported in "Philosophical Magazine B", 1979, Vol. 39, No. 3, p. 277-282, wherein the studied materials were prepared by chemical reduction of chloroauric acid using a polyester prepolymer as a reducing agent. The text, "Vapor Deposition", edited by Carrol F. Powell et al, John Wiley & Sons, 1966, presents a rather comprehensive teaching on vapor-deposited materials, including the fundamentals, techniques and applications thereof.

DISCLOSURE OF INVENTION

In accordance with the present invention, a substrate, or a surface of an article or the like, is provided with a colored polymeric film-like coating by a method which includes concurrently depositing a plasma-formed polymer and particulates of a size and distribution throughout the being-deposited polymer so as to alter the color of the deposited polymer through selective light scattering and absorption by the deposited particulates to provide a desired visible color. In the practice of the invention, a plasma-polymerizable material is introduced into a deposition apparatus having an evacuated environment conducive to and adapted for both plasma polymerization and deposition of a polymer from the material with the introduced material passing through an electrical discharge region conducive to creating a plasma effective to polymerize the material with depositing of formed polymer onto the surface of a substrate or the like, which contacts a cathode within said apparatus or which serves as the cathode, with the cathode at a potential conducive for the depositing. Concurrently with introducing of plasma-polymerizable material and depositing of polymer formed therefrom, one also introduces into and/or forms particulates of appropriate size for the desired color in the requisite amount for the desired color upon their distribution throughout the deposited polymer. The plasma formed polymer and the particulates concurrently are deposited on the substrate. Most generally the plasma-polymerizable material is a monomer and is introduced in an admixture of an inert gas, such as argon, and the particulates are inorganic and opaque, such as metal particles, and are formed of appropriate size within the vacuum apparatus such as by thermal evaporation or electron beam evaporation, or sputtering of a metal under vacuum conditions.

The substrate surfaces and/or articles can be of steel, other metals, glass, ceramics, resinous polymers, etc. and their temperature can be held quite low during deposition, such as about room temperature. The colored polymeric coatings produced by the invention typically are continuous, pinhole free, and highly crosslinked. Depending on the selection of plasma-polymerizable material and operative parameters, the coating's mechanical properties can be varied considerably, e.g. from glass-like hardness to rubber consistency. An apparatus for practice of the invention also could feature a closed-loop coating system that has little to virtually no pollution impact on the environment.

Possible applications for the colored polymeric coatings are numerous. They can be used to coat sheet steel for corrosion protection. They can serve as decorative and/or protective coatings for metal, paper, glass, cloth, and plastic materials and articles, as well as encapsulating coatings for microelectronic circuits. They also could be adapted to fabricate integrated optical circuits directly. The range of colors obtainable for the colored polymeric coatings is virtually unlimited and can be any color substantially throughout the entire visible color spectrum. This can be accomplished by material selection and adjusting processing parameters so as to produce the primary colors and various additive combinations of primary colors.

BRIEF DESCRIPTION OF THE DRAWINGS

Details of the invention are discussed in connection with the accompanying drawings in which.

MORE DETAILED DESCRIPTION OF THE DRAWINGS

Figure 1:
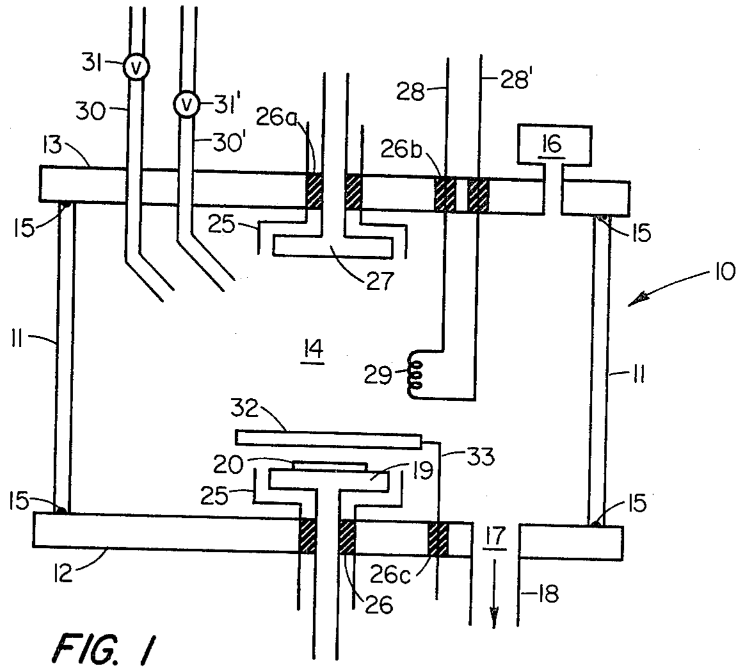
FIG. 1 is a partially schematic, semi-schematic, and cross-sectional view of a bell-jar type apparatus for practice of the invention in which depositing colorant particulates are provided by thermal evaporation.

Referring to the drawings in which in each illustrated drawing figure the same numeral identifies the same or equivalent component for each apparatus, the FIG. 1 illustrated apparatus is generally designated 10. Apparatus 10 is of bell-jar type configuration including side wall or walls 11 of glass or stainless steel and a bottom plate 12 and top plate 13, generally of stainless steel. The interior region of the apparatus is generally designated 14. Top plate 13 and bottom plate 12 are held in firm air-tight engagement with side wall or walls 10 by a therebetween suitable synthetic rubber gasket material 15 (e.g. Viton®, E. I. duPont de Nemours and Company, a copolymer of hexafluoropropylene and vinylidene chloride) and requisite clamping means not illustrated. Opening into the interior region 14 of apparatus 10 is a capacitance manometer pressure gauge designated 16. Also opening into the interior region 14 of apparatus 10 is an opening 17 and an evacuating tube 18 through which the interior region 14 is evacuated and maintained at the requisite reduced pressure for practice of the invention. Evacuating tube 18 leads to conventional trap and pump means, not illustrated, as are known for purposes of deposition by evaporation.

Apparatus 10 includes a water-cooled cathode means 19, whose water cooling and electrical circuitry means are conventional and are not illustrated, which cathode means 19 also functions by a means not illustrated to have clamped thereto a substrate 20 which has an exposed surface 21 for coating with a colored polymeric film-like coating 22.

Figure 4:
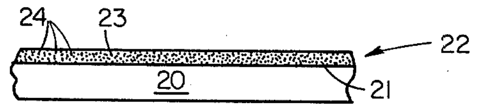
FIG. 4 illustrates schematically a substrate coated with the colored polymeric film-like coating provided by the invention.

FIG. 4 more clearly illustrates schematically, and by an enlarged not to true scale, a substrate 20 and its surface 21 upon which there is deposited a colored polymer polymeric film-like coating consisting essentially of a polymer matrix 23 containing therein particulates 24 or color centers of an appropriate size and distribution adapted through selective scattering and absorption of light to provide a desired color.

In apparatus 10, the cathode means 19 is shielded by a metal shield 25 except for a surface of cathode means 19 having clamped thereto the substrate 20. The cathode means 19 and metal shield 25 pass through the bottom plate 12 with an electrical insulating material 26 therebetween. Directly overhead of cathode means 19 is located a sputter electrode means 27 which also includes a metal shield 25 therefore shielding sputter electrode means 27 except for a surface of the sputter electrode means 27 facing substrate 20. Electrical insulating material **26*a* is found between sputter electrode means 27 and its metal shield 25 where these two pass through the top plate 13. Also passing through top plate 13 are electrical wires 28 and 28' leading to a filament resistance heater 29, generally of tungsten, with wires 28 and 28' insulated by electrical insulation 26*b* from each other and from top plate 13 which they pass therethrough. Not illustrated for wires 28 and 28' are conventional electrical circuitry, controls, switches, and power supply for providing electrical input for filament resistance heater 29. Also passing through top plate 13 are illustrated two conduits 30 and 30' for passage therethrough of gaseous plasma-polymerizable material and/or other materials into interior region 14. Each conduit 30 and 30' includes a control valve 31 and 31', respectively, for opening, closing, and regulating flow of the material(s) into interior region 14, and also includes suitable sources and supply means not illustrated, of materials such as plasma-polymerizable material, inert gas, particulates, etc. for introduction into interior region 14**.

In interior region 14 and between sputter electrode means 27 and substrate 20 there is located a movable shutter means 32, generally of stainless steel, which movable shutter means is capable of being moved to and from its between position to a position providing a clear path between the sputter electrode means 27 and substrate 20 with movement by means of an extension 33 extending from movable shutter means 32, which extension 33 passes through bottom plate 12 and is insulated therefrom by insulating material **26*c* so as to make movable shutter means 32** operable exteriorly by known means to its to and from locations.

Figure 2:
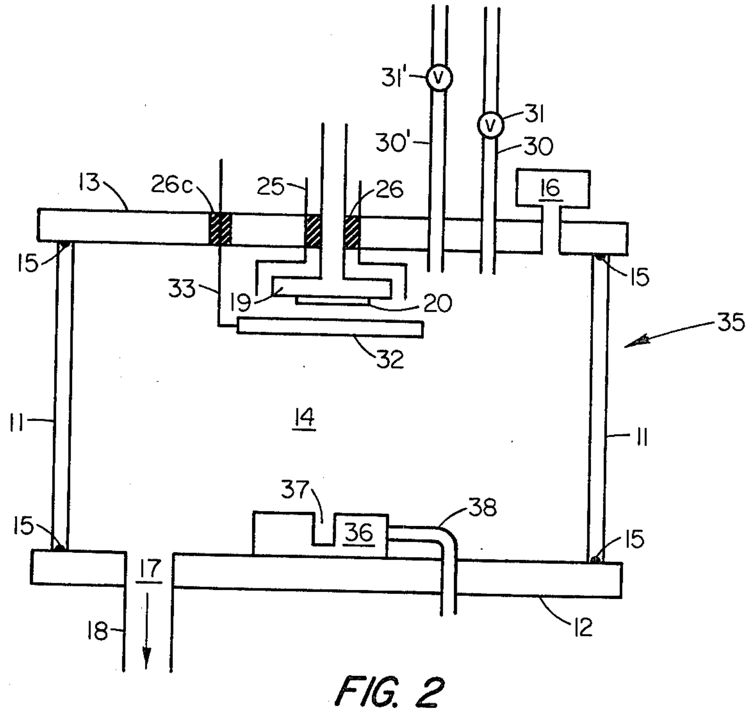
FIG. 2 is a partially schematic, semi-schematic, and cross-sectional view of another bell-jar type apparatus for practice of the invention in which depositing colorant particulates are provided by an alternative thermal evaporation means.

FIG. 2 illustrates an alternative apparatus generally designated 35. In conformity with apparatus 10 of FIG. 2, apparatus 35 also illustrates a bell-jar type of apparatus and comprises in appropriate relationship side wall or walls 11, a bottom plate 12, a top plate 13, an interior region 14, and gasket material 15 as well as not illustrated clamping means for assembly and holding of these components in air-tight relationship. Apparatus 35 also includes an opening 17 through bottom plate 12 and an evacuating tube 18. Apparatus 35 further includes a capacitance manometer pressure gauge 16 as well as conduits 30 and 30' for introducing plasma-polymerizable material(s), which gauge 16 and conduits 30 and 30' pass through top plate 13 to open into interior region 14 with conduits 30 and 30' each respectively including valves 31 and 31′ for control and regulation of material being introduced and also respective sources and supply means, not illustrated, for materials to be introduced into interior region 14. Akin to apparatus 10 of FIG. 1, apparatus 35 also includes a water-cooled cathode means 19, a metal shield 25 therefor, and electrical insulating material 26 therebetween, as well as a movable shutter means 32, an extension 33 therefrom, and insulation 26c, but differs by having these components in relationship with the top plate 13 of apparatus 35 instead of in a corresponding relationship with bottom plate 12 of apparatus 10. In contrast to apparatus 10 of FIG. 1, the FIG. 2 apparatus 35 includes a water-cooled inductively heated evaporation source means, generally designated 36. Source means 36 includes therein a cavity 37 which faces cathode means 19 and in which material is placed for subsequent evaporation to provide appropriate size particulates in a requisite quantity. Running from source means 36 is a conduit 38 for water flow for cooling of means 36 with conduit 38 passing through bottom plate 12. Not illustrated for evaporation source means 36 are its ancillary conventional component means such as for its inductive heating and for supplying and flowing the cooling water.

Figure 3:
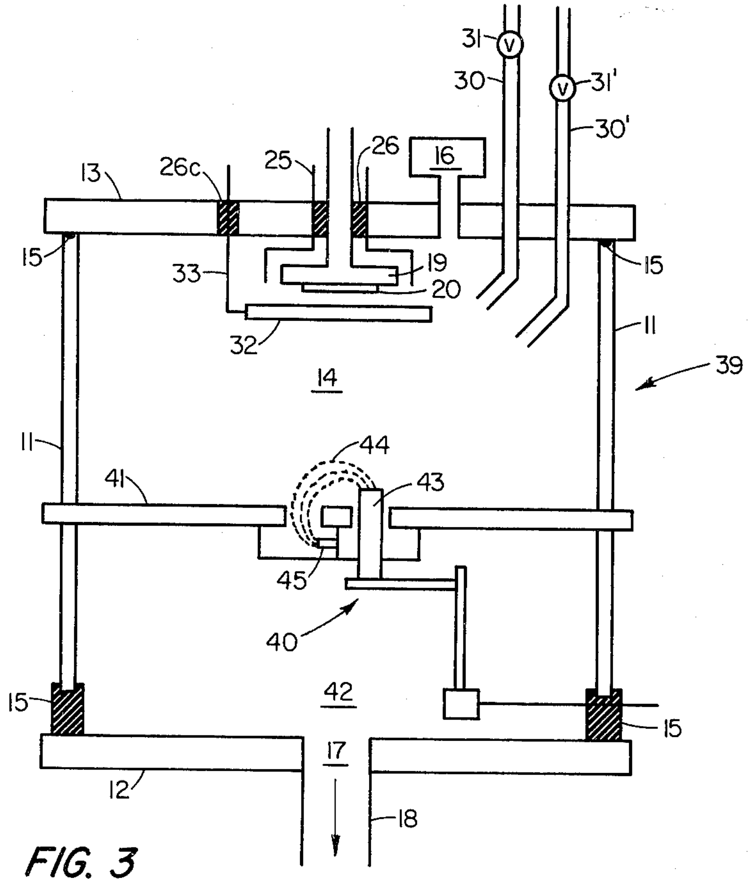
FIG. 3 is a partially schematic, semi-schematic, and cross-sectional view of still another useful apparatus for practice of the invention with this apparatus illustrating an electron beam evaporator means for providing the depositing colorant particulates.

FIG. 3 also illustrates an alternative apparatus, generally designated 39. In conformity with apparatuses 10 and 35 of FIGS. 1 and 2, apparatus 39 also illustrates a bell-jar type of apparatus and comprises in appropriate relationship side wall or walls 11, a bottom plate 12, a top plate 13, an interior region 14, and gasket material 15 as well as not illustrated clamping means for assembly and holding of these components in air-tight relationship. Apparatus 39 alike apparatus 35 of FIG. 2, also includes: an opening 17 through bottom plate 12 and an evacuating tube 18; a capicitance manometer pressure gauge 16 as well as conduits 30 and 30′ for introducing material, which gauge 16 and conduits 30 and 30′ pass through top plate 13 to open into interior region 14 with conduits 30 and 30′ each respectively including valves 31 and 31′ for control and regulation of introduced material and respectively including sources and supply means, not illustrated, for materials to be introduced into interior region 14; and a water-cooled cathode means 19, a metal shield 25 therefor, and electrical insulating material 26 therebetween as well as a movable shutter means 32, an extension 33 therefrom, and insulation 26c. Apparatus 39 of FIG. 3 differs from apparatus 10 and 35 in that it includes an electron beam evaporator, generally designated 40, instead of the filament resistance heater 29 and heated evaporation source means 36 of apparatus 10 and 35, respectively. Electron beam evaporator 40 is affixed to a differential pressure barrier 41, which spans side wall or walls 11, so as to provide apparatus 39 with its already noted interior region 14, intermediate the electron beam evaporator 40 and its cathode 19 which includes a substrate 20 affixed thereto by a clamping means, not illustrated. Between differential pressure barrier 41 and bottom plate 12 there is a lower interior region generally designated 42. Electron beam evaporator 40 comprises a second phase source material electrode 43, which provides the requisite particulates from striking of an electron beam 44 between electrode 43 and another electrode 45 of evaporator 40. Not specifically designated and/or explicitly illustrated for electron beam evaporator 40 are means affixing it to barrier 41, electrical circuitry and power supply thereto, controls for regulating its position and initiating and maintaining its electron beam, and the like, all of which are conventional and known components for an electron beam evaporator.

For practice of the method of the invention with the apparatuses illustrated in the drawings, the substrate 20 to be coated is laid on or affixed to the cathode means 19; or in the alternative for coating an article then the article is mounted to the cathode, or with an electrical conductive article, the article itself may be employed as the cathode upon requisite electrical contacts being made with the article. For providing particulates by evaporation techniques, in the instance of apparatus 10 one clamps or affixes a material to be evaporated to the filament resistance heater 29; in the instance of apparatus a material for evaporation is placed in cavity 37 of the water-cooled inductively heated evaporator source means 36; or one sees to it that the electrode 43 is composed of or capable of providing the requisite material for evaporation in the instance of employing the electron beam evaporator 40 in apparatus 39. The apparatus then is assembled and its wall or walls 11 and bottom plate 12 and top plate 13 clamped in assembled relationship to provide an air-tight assembly. Thereupon the apparatus is evacuated through opening 17 and evacuating tube 18 by a not illustrated conventional pumping means for such purposes. If desired, the apparatus may be purged by an inert gas, such as argon, helium, nitrogen, or the like, prior to evacuation, by introducing the inert gas into interior region 14 through a conduit 30 and the apparatus then evacuated, with this procedure performed sequentially several times, if desirable.

With the interior region 14 evacuated, most generally to between 0.001 to 5 torrs and higher, one initiates flow of one or more plasma-polymerizable materials through conduit 30 and/or conduit 30′ (and any additional like conduits, not illustrated, which may be incorporated in the apparatus, if desirable to introduce a plurality of materials not in admixture by an inert gas) and at the same time imposes a requisite r. f. current through the cathode into the region directly above the cathode.

Concurrently with the introduction of plasma-polymerizable material and imposing of an r. f. field for plasma creation, one also initiates the providing of particulates of appropriate size and in requisite amount to provide the needed distribution that in conjunction with size will provide the desired color. In the instance of apparatus 10, the filament resistance heater is heated to the requisite temperature for thermal evaporation of the material affixed thereto. In the instance of apparatus 35, the induction field is imposed on means 36 with the material in cavity 37 brought to the requisite temperature for thermal evaporation. In the instance of apparatus 39, an electron beam is struck and maintained with employment of a current and potential requisite for producing the particular requisite particulates.

Following the initiation of flow of plasma-polymerizable material, the imposition of r. f. field for plasma creation, and the initiation of providing of particulates of appropriate size in appropriate amount for the requisite distribution for providing a desired color, then the movable shutter means 32 is moved to a location exposing the substrate 20 or article, being provided with colored polymeric film-like coating, to both the plasma field of plasma-polymerizable material and formed-in-situ or introduced particulates. Following a desired time for the exposing, the movable shutter means 32 is returned to its position of shielding the substrate 20 or the article. There then is discontinued the providing of particulates (shutting off of the thermal evaporation means) as well as the introducing of plasma-polymerizable material and imposition of the r. f. field. The evacuation means also may be discontinued and the apparatus interior region 14 permitted to return to atmospheric pressure so that the apparatus may be disassembled for removal of the coated substrate or article.

The particulate size distribution and particulate distribution in the deposited plasma formed polymer control the color which is observed in the prepared colored polymeric film-like coating. These respective distributions are varied and controlled, in the instance of thermal evaporation, by control of evaporation prameters, usually the evaporation rate and substrate temperature. Distributions also are controllable by the choice of the material evaporated to form the particulate and also this chosen material in combination with other process parameters. For example, in "Jap. J. of Appl. Physics", Vol. 4, No. 10, Oct., 1965, p. 707-711 there are reported preparations of fine particles of iron, cobalt, and nickel metal by evaporation in an atmosphere of argon gas at low pressure. This article reports the metal's particle size was controlled by changing the argon gas pressure with argon gas pressures of 0.5 torr providing metal particles averaging 8 mμ, 3 torrs providing metal particles averaging 30 mμ, and 35 torrs providing metal particles averaging 200 mμ. The particulate distribution, and/or distance averaged between the deposited particulates, generally is controlled through the rate of thermal evaporation in relation to the rate of formed and deposited plasma polymerized polymer. With the thermal evaporation rate also limited so as not to deposit a continuous coating, the evaporated material forms as numerous particulates and in most instances with the particulates formed at relatively uniform distances from each other so as to be concurrently deposited at such distances in the concurrently deposited plasma-polymerized material. The rate of thermal evaporation is controllable in the customary manners through the specific temperature employed for thermal evaporation as well as the employed specific reduced pressure and the particular chosen distance between the surface of the substrate being coated and the source of thermal evaporation of the material turned into particulates.

For each specific material and for various materials for providing the particulates, one experimentally can evaluate an appropriate range of particulate size distributions and particulates' distance apart distribution in the deposited plasma formed polymer and thus determine the particular particulate size distributions and distances apart distributions so as to enable a providing of each of the primary colors of red, green, and blue for providing the corresponding red, green, or blue colored polymeric film-like coating. With the requisite determined parameters for providing each primary color than one is able not only to provide colored polymeric film-like coatings of each of the primary colors, but also of any to all combinations of these primary colors and thus substantially any color in the visible spectrum, as desired, in the colored polymeric film-like coatings. This can be accomplished by depositing successive layers of the colored polymeric film-like coatings of the various primary colors requisite to provide the desired color. It also can be accomplished by variance of parameters supplying the particulates from those specific for providing one primary color to those parameters specific for providing another primary color, or colors, whose requisite addition to the first primary color provides the desired color, without interruption of the forming and depositing of the plasma formed polymer and with such switching of sets of parameters for the primary colors being rapid enough that the provided additive color appears to be substantially uniform throughout the prepared coating. In such usages of several of the primary colors to provide a desired colored coating, one makes use of art recognized qualitative laws for additive coloring. Thus, red plus green gives yellow, green plus blue gives blue-green, blue plus red gives purple, red plus yellow gives orange, yellow plus green gives green-yellow, green plus blue-green gives bluish green, blue-green plus blue gives greenish blue, blue plus purple gives purple-blue, purple plus red gies red-purple, etc.

BEST MODE OF CARRYING OUT INVENTION

The best mode presently known for carrying out the invention is illustrated by the foregoing description of the drawings and is demonstrated by the following examples. However, since the examples are small scale laboratory practices, the benefits and advantages to be derived upon scale up and from commercial practice and from application to commercial products are expected to be of much greater value.

EXAMPLE A

In the aforedescribed apparatus 10 of FIG. 1 there is clamped thereto about 2 g. pure aluminum for vacuum evaporation purposes to filament resistance heater 29. Four each 1 in. (2.54 cm.) by 3 in. (7.62 cm.) glass slides, previously cleaned by methanol, are mounted on the surface of the cathode 19. The apparatus is evacuated and then back filled with argon to a pressure of $100\times10^{-3}$ torr, after which a r. f. power of 15 watts is applied. After about 5 minutes of this sputter cleaning in this relatively reduced air pressure, a hard vacuum of $3\times10^{-6}$ torr is obtained. With the shutter 32 between the glass slides and the filament, which is located about 5 in. (12.7 cm.) from the glass slides, the filament is heated to a temperature closely approximating 2000° C. (3632° F.). At the same time a flow of plasma-polymerizable material, monomeric hexamethyldisiloxane, with dry argon gas of a ratio of about nine parts of volume of the plasma-polymerizable material admixed in each part by volume of argon and at a rate of about 10 to 30 sccm of the admixture is introduced while the pressure within the apparatus rises to $50\times10^{-3}$ torr. The orifice, through which this mixture is introduced, is located about 3 in. (7.62 cm.) from the glass slides while a power now of 5 watts of r. f. at a frequency of 13.56 MHZ is applied to the cathode. At this time the shutter means is swung away from its position of shielding the glass slides. Flow of the monomer entrained in the argon gas and evaporation of aluminum metal is carried forth concurrently and continued for about 5 minutes, while maintaining a reduced pressure of $50\times10^{-3}$ torr within the apparatus. Then both heating of the filament and flow of the argon/monomer mixture is stopped simultaneously. The system is vented to atmosphere and the coated glass slides are removed and examined. Under white light an examination by reflected light shows an apparent blue-colored polymeric film on the top surface of each glass slide. The films appear to the eye to be smooth, relatively thin (in the order of slightly less than one micron thick) and nonconducting when measured with an ohmmeter.

EXAMPLE B

Example A is repeated at substantially the same conditions except for the evaporative material there is employed boron metal clamped to resistance heater 29. The resulting prepared coated glass slides are covered with a smooth, thin, red-colored polymeric film.

EXAMPLE C

Example A is repeated at substantially the same conditions except there is employed the apparatus 35 of FIG. 2 with the aluminum being placed in the cavity 37 of the inductively heated evaporation source means 36. The produced films are blue-colored and appear to be substantially the equivalent of those prepared in accordance with Example A.

EXAMPLE D

Example A is repeated at substantially the same conditions except there is employed the apparatus 39 of FIG. 3 with source material electrode 43 being of aluminum. The produced films are blue-colored and appear to be substantially the equivalent of those prepared in accordance with Example A.

EXAMPLE E

Example A is repeated under substantially the same conditions except that in place of the hexamethyldisiloxane there is employed monomeric styrene. There results a blue-colored polymeric film on the surface of the glass slides.

EXAMPLE F

Apparatus 35 is employed with nickel metal placed in cavity 37 of its inductively heated evaporator source means 36. Hexamethyldisiloxane in admixture with dry argon gas is introduced into apparatus 35 to provide an argon partial pressure of about 3 torrs in interior region 14 and this region 14 is subjected to a r. f. frequency adapted to plasma polymerize the hexamethyldisiloxane while the nickel metal is inductively heated to about 1800° C. Glass slides are used as the substrate onto which there concurrently deposits plasma-polymerized hexamethyldisiloxane and particulates formed from the thermal evaporation of the heated nickel metal. After several minutes of operation, the flow of hexamethyldisiloxane and argon gas are discontinued along with ceasing the heating of the nickel metal. The system then is vented to the atmosphere with the glass sides being removed and examined. The prepared coating on the glass slide's surface is a thin, green-colored film.

Although the foregoing specific examples present only limited and specific illustrations of the invention numerous other embodiments are possible and are contemplated.

In place of the limited number of plasma-polymerizable materials illustrated in the specific examples, there are contemplated as useful in the invention numerous conventionally polymerizable monomers including monomeric acrylics, such as methyl methacrylate and ethyl acrylate, silicone monomers, fluorocarbon monomers, styrene, isobutylene, butadiene, vinyl acetate and acrylonitrile, to mention only a few. Reference is made to the aforementioned section entitled "Mechanisms of Plasma Polymerization" in the aforementioned "Techniques and Applications of Plasma Chemistry" and to its Table 5.5 for listing under the column headed "Monomers" for additional plasma-polymerizable materials contemplated as useful in the invention. It should be mentioned that among the materials are included aromatic substances, such as benzene, toluene, xylene, etc. normally not considered to be monomers and to be polymerizable by means other than plasma polymerization.

In place of the limited number of materials illustrated in the specific examples as useful for the particulates or coloring centers in the colored polymeric film-like coatings, there are contemplated as useful in the invention numerous other materials. These materials for particulates include substantially all materials known to be capable of thermal evaporation at reduced pressures conducive also to plasma polymerization. Thus, contemplated as useful are each of the solid elements, especially the metal and metalloid elements, as well as alloys and as well as some compounds of these elements, with a listing of only a few of them including: aluminum; antimony, arsenic, bismuth, beryllium, chromium, cobalt, copper, germanium, gold, hafnium, iron, lead, molybdenum, nickel, niobium, tantalum, platinum-group metals, rhenium, thorium, tin, titanium, tungsten, uranium, vanadium, zirconium, boron, borides, carbides, nitrides, oxides, silicon and silicides, etc. with a proviso being that the material used for the particulates be substantially compatible with the employed therewith particular plasma polymerizable material to the extent that plasma polymerization can and does occur and proceed.

Although only glass slides and their surface have been illustrated in the specific examples, numerous other substrate materials and articles are contemplated as being capable of being coated by practice of the invention. These useful substrate materials also include metal surfaces and articles having metal surfaces, ceramic surfaces and articles having ceramic surfaces, screens, cloth, textiles, resinous polymeric plastic surfaces and articles, leather, some inorganic salts, and the like.

Although the specific examples illustrate the invention with the particulates being provided by thermal evaporation for codeposition with the plasma polymerized material, alternative means of providing the particulates are possible. For example, the material providing the particulates may be prepared in the requisite very fine particle size by an conventional known means therefor and then these particles entrained in an inert gas, e.g. argon, or the like, and introduced into the apparatus and into the region where plasma polymerization occurs so as to codeposit concurrently with the plasma polymerized material to provide the colored polymeric film-like coating. Additionally, although sputtering has been mentioned earlier as a means to provide the particulates for codeposition, modifications of the apparatus illustrated in the drawing Figures would be necessary to practice the invention with employment of sputtering. Briefly, the illustrated apparatuses for practice with sputtering to provide the particulates would require modifications including an additional cathode as a source for the sputter material and an additional anode as well as conventional auxiliary components to make the anode and cathode operative for sputtering purposes as well as a locating of the cathode in a location adapted that sputtered material reaches the region of plasma polymerization so as to codeposit with plasma polymerized material.

We claim:

1. A method for coating a surface of a substrate with a colored polymeric film-like coating of selected visible color, which process comprises:

(a) introducing a plasma-polymerizable material into an apparatus having an evacuated interior environment with the introduced material passing through an electrical discharge region adjacent to said surface and of a frequency conducive to polymerize said material to a polymer and with said apparatus and said environment adapted to plasma polymerize said material;

(b) plasma polymerizing said plasma-polymerizable material to said polymer and depositing said polymer onto the surface of said substrate which serves as a cathode element or is contacting a cathode element within said apparatus while said cathode element is maintained at an electrical potential conducive for said depositing; and (c) concurrently depositing discrete particulates which are opaque and of colloidal size and of a metal or metalloid along with the depositing of said polymer onto the surface of said substrate and with the depositing particulates of a size and dispersed distribution throughout the concurrently deposited polymer so as to alter the color of the polymer through selective scattering and adsorption of light by said deposited particulates to provide said selected visible color.

2. The method of claim 1 which includes the introducing of said plasma-polymerizable monomer in an admixture with argon gas.

3. The method of claim 2 in which the depositing particulates are entrained in the argon gas which is in admixture of the plasma-polymerizable monomer being introduced.

4. The method of claim 2 in which the depositing particulates are provided by vapor deposition from a source within the evacuated interior environment.

5. The method of claim 4 which includes the providing of the depositing particulates which are derived by evaporation at reduced pressure from a molten mass of said metal or metalloid and are deposited onto said surface which is of lower temperature than the molten mass.

6. The method of claim 4 which includes the providing of the depositing particulates by sputtering at reduced pressure of said material from a cathode.

7. The method of claim 2 adapted to deposit said particulates of a size and distribution providing at least one of the primary colors of blue, green, and red.

8. The method of claim 7 adapted to deposit said particulates of several sizes and distributions providing at least two primary colors which by additive combination provide said visible color.

9. The method of claim 2 including a thermal evaporating of said metal or metalloid to provide the concurrently deposited particulates.

10. A method for coating a surface of a substrate with a colored polymeric film-like coating of a selected color comprising plasma-polymerized polymer and dispersed particles of a metal, which process comprises:

(a) introducing a plasma-polymerizable material into an evacuated environment and passing the introduced material through an electrical discharge region adjacent to said surface and adapted to plasma polymerize said material;

(b) plasma polymerizing said introduced plasma-polymerizable material and depositing polymer in a film-like coating on the surface of said substrate which serves as a cathode element or contacts a cathode element with said cathode element maintained at an electrical potential conducive for said depositing;

(c) concurrently thermally evaporating metal and depositing colloidal-size particles of said metal along with said plasma polymerizing of said plasma-polymerizable material and depositing polymer with the depositing of said particles as discrete particles dispersedly distributed throughout said deposited polymer and with the depositing said particles of a size and distribution providing the selected color through selective scattering and adsorption of light by said particles.

* * * * *